United States Patent
Patel et al.

(10) Patent No.: US 12,430,133 B1
(45) Date of Patent: Sep. 30, 2025

(54) DEVICES AND METHODS FOR MANAGING COMMAND FETCH AND COMMAND EXECUTION

(71) Applicant: SK Hynix NAND Product Solutions Corp., Rancho Cordova, CA (US)

(72) Inventors: Dimpesh Patel, Surrey (CA); Jonathan Hughes, Longmont, CO (US); Teddy Greer, Grayson, KY (US); Neelesh Vemula, Santa Clara, CA (US); Jonathan de Vries, Folsom, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 18/659,834

(22) Filed: May 9, 2024

(51) Int. Cl.
*G06F 9/38* (2018.01)

(52) U.S. Cl.
CPC .......... *G06F 9/3802* (2013.01); *G06F 9/3856* (2023.08)

(58) Field of Classification Search
CPC .... G06F 3/0655; G06F 3/0656; G06F 3/0659; G06F 9/3802; G06F 9/3814; G06F 9/3836; G06F 9/4881; G06F 15/7821
See application file for complete search history.

(56) References Cited

U.S. PATENT DOCUMENTS

| | | | |
|---|---|---|---|
| 6,771,269 B1 * | 8/2004 | Radecki | G09G 5/363 345/503 |
| 2017/0090753 A1 | 3/2017 | Benisty et al. | |
| 2017/0262952 A1 * | 9/2017 | Sarna | G06T 1/60 |
| 2018/0232178 A1 * | 8/2018 | Iwaki | G06F 3/0659 |
| 2020/0278808 A1 * | 9/2020 | Zhu | G06F 3/0659 |
| 2021/0303346 A1 * | 9/2021 | Shahim | G06F 9/4881 |
| 2022/0027092 A1 | 1/2022 | Katagiri | |
| 2022/0066696 A1 * | 3/2022 | Kang | G06F 3/0659 |
| 2023/0305747 A1 * | 9/2023 | Subramanian | G06F 3/067 |
| 2023/0333776 A1 | 10/2023 | Balasubramani et al. | |
| 2023/0367513 A1 | 11/2023 | Yang | |
| 2024/0069808 A1 * | 2/2024 | Bukhari | G06F 3/0659 |

FOREIGN PATENT DOCUMENTS

CN 116185501 A 5/2023

* cited by examiner

*Primary Examiner* — Jacob Petranek
(74) *Attorney, Agent, or Firm* — Haley Guiliano LLP (57) ABSTRACT

A device and related method, the device including system memory for storing at least two queue groups, each of which includes commands, and processing circuitry. For each respective queue group, the processing circuitry determines an allocated command value indicative of a number of commands that are capable of being fetched from the respective queue group, determines a number of outstanding commands to be fetched from the respective queue group, and compares the allocated command value to the number of outstanding commands to be fetched for the respective queue group. When the allocated command value is greater than the number of outstanding commands to be fetched for the respective queue group, the processing circuitry designates the respective queue group as an available queue group. The processing circuitry then selects a queue group from the designated available queue groups and fetches at least one command from the selected queue group.

20 Claims, 5 Drawing Sheets

DEVICES AND METHODS FOR MANAGING COMMAND FETCH AND COMMAND EXECUTION

TECHNICAL FIELD

The present disclosure is directed to devices and methods for managing fetching and execution of commands received from a host.

SUMMARY

In accordance with the present disclosure, devices and methods are managing the fetching and execution of commands received from a host which is communicatively coupled to the device (e.g., a storage device). The device (e.g., a solid-state drive (SSD) device) includes system memory, which includes temporary storage (e.g., queue groups) for commands received from the host, and persistent storage media, which may include memory blocks with pages or super pages of memory. The device and method disclosed herein may use firmware of the device along with processing circuitry to perform the managing of fetching and execution of commands received from the host. Managing fetching and execution of the received commands provides a command workload balancing which improves the processing latency for certain (e.g., high priority) commands and reduce QoS degradation. The reduced processing latency for certain commands and reduced QoS degradation results in an improved performance speed of device to fetch commands and process commands to access persistent storage media while processing circuitry concurrently executes commands. The commands may include any one or more read or write requests, such as direct memory access (DMA) commands.

The device (e.g., SSD device) may include processing circuitry, which receives commands from a host and temporarily stores each command in a queue group of the system memory. The processing circuitry is further to, for each respective queue group in system memory, determine an allocated command value indicative of a number of commands that are capable of being fetched from the respective queue group, determine a number of outstanding commands to be fetched from the respective queue group, and compare the allocated command value and the number of outstanding commands to be fetched for the respective queue group to determine whether to designate the respective queue group as an available queue group. In some embodiments, each queue group of the system memory includes a submission queue to temporarily store the commands received from the host, and a completion queue to store command fetch responses. Once each respective queue group has been evaluated, by processing circuitry, to determine whether the respective queue group should be designated as an available queue group, the processing circuitry then selects a queue group from the available queue groups and fetches at least one command from the selected queue group. In some embodiments, processing circuitry generates a command fetch request and transmits the command fetch request to the system memory. In some embodiments, at least one command from the selected queue group is sent to the processing circuitry by using a command fetch response, which includes at least one fetched command.

In some embodiments, the device (e.g., a storage device) is provided with persistent storage media and processing circuitry that are communicatively coupled to each other. In some embodiments, the processing circuitry includes at least one command execution queue to temporarily store fetched commands prior to execution. In some embodiments, the processing circuitry includes a processor to execute commands, providing general processing capabilities for the device and to access persistent storage media. In some embodiments, the processing circuitry accesses commands from at least one of the command execution queues to execute the commands. In such embodiments, the processing circuitry is to, for each respective command execution queue, determine whether a respective number of commands in the respective command execution queue exceeds a threshold. When the processing circuitry determines that the number of commands in the respective command execution queue exceeds the threshold, the processing circuitry designates the respective command execution queue as an available command execution queue. The processing circuitry then selects a command execution queue from the available command execution queues in order to access at least one command from the selected command execution queue. In some embodiments, the command is a read command, which includes a memory address from which to access read data in the persistent storage media. In other embodiments, the command is a write command, which includes write data and a memory address at which to store the write data in persistent storage media.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, and/or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

DETAILED DESCRIPTION

In accordance with the present disclosure, devices and methods are provided for managing fetching and accessing commands from a host communicatively coupled to a device (e.g., a storage device). The device (e.g., an SSD device) includes system memory and processing circuitry. The system memory includes temporary storage for commands received from the host. In some embodiments, the device may include persistent storage media, which may include memory blocks with pages or super pages of memory. The device and method disclosed herein may use firmware of the device along with processing circuitry to perform the managing of fetching and execution of commands received from the host. The commands may include any one or more read or write requests, such as direct memory access (DMA) commands.

The device (e.g., SSD device) may include processing circuitry, which evaluates each respective queue group in system memory. To evaluate a respective queue group, the processing circuitry determines an allocated command value indicative of a number of commands that are capable of being fetched from the respective queue group, determines a number of outstanding commands to be fetched from the respective queue group, and compares the allocated command value and the number of outstanding commands to be fetched for the respective queue group to determine whether to designate the respective queue group as an available queue group. In some embodiments, each queue group of the system memory includes a submission queue to temporarily store the commands received from the host, and a completion queue to store command fetch responses. Once each respective queue group has been evaluated, by processing circuitry, the processing circuitry then selects a queue group from the available queue groups and fetches at least one command from the selected queue group. In some embodiments, the processing circuitry selects an available queue group randomly or based on a round-robin manner. In some embodiments, processing circuitry generates a command fetch request and transmits the command fetch request to the system memory. In some embodiments, at least one command from the selected queue group is sent to the processing circuitry by using a command fetch response, which includes at least one fetched command.

In some embodiments, the device (e.g., a storage device) is provided with persistent storage media and processing circuitry that are communicatively coupled to each other. In some embodiments, the processing circuitry includes at least one command execution queue to temporarily store fetched commands prior to execution. Each respective command execution queue is configured to store commands which have been fetched, by processing circuitry, from a corresponding queue group of system memory. In some embodiments, the processing circuitry includes a processor to execute commands, providing general processing capabilities for the device, to access persistent storage media and to fetch commands from system memory. In some embodiments, the processing circuitry accesses commands from at least one of the command execution queues to execute the commands. In such embodiments, the processing circuitry is to determine available command execution queues based on whether a respective number of commands in the respective command execution queue exceeds a threshold. When the processing circuitry determines that the number of commands in the respective command execution queue exceeds the threshold, the processing circuitry designates the respective command execution queue as an available command execution queue. The processing circuitry then selects a command execution queue from the available command execution queues in order to access at least one command from the selected command execution queue. In some embodiments, the command is a read command, which includes a memory address from which to access read data in the persistent storage media. In other embodiments, the command is a write command, which includes write data and a memory address at which to store the write data in persistent storage media.

For purposes of brevity and clarity, the features of the disclosure described herein are in the context of a device (e.g., an SSD device) having processing circuitry and persistent storage media. However, the principles of the present disclosure may be applied to any other suitable context for a device that manages the fetching and executing commands received from a host. The device may include processing circuitry and persistent storage media, which are communicatively coupled to each other by a data bus or interface. In some embodiments, the commands are sent from the host to the device via a network bus or interface.

In particular, the present disclosure provides devices and methods that improves the processing latency for certain (e.g., high priority) commands and reduce QOS degradation. The reduced processing latency for certain commands and reduced QoS degradation results in an improved performance speed of device to fetch commands and process commands to access persistent storage media while processing circuitry concurrently executes commands.

In some embodiments, the processing circuitry includes a processor and a memory controller. The memory controller may include command execution queues, each of which corresponds to a respective queue group in system memory from which commands are fetched, each command execution queue is configured to temporarily store commands until the data the processing circuitry accesses the fetched commands. In some embodiments, the processor of the processing circuitry may be a highly parallelized processor capable of handling high bandwidths of incoming commands quickly (e.g., by starting simultaneous processing of commands before completion of previously received commands). In some embodiments, the processor is to execute commands concurrently and independently with respect to the memory controller processing command from the host.

The persistent storage media of the device may be referred to as the main memory of the device. In some embodiments, the main memory of the device disclosed herein may contain any of the following memory densities: single-level cells (SLCs), multi-level cells (MLCs), triple-level cells (TLCs), quad-level cells (QLCs), penta-level cells (PLCs), and any suitable memory density that is greater than five bits per memory cell.

In some embodiments, the device and methods of the present disclosure may refer to a storage device (e.g., an SSD device) which is communicatively coupled to a host (e.g., host devices) by a network bus or interface. In some embodiments, the device is communicatively coupled to more than one host, and each host may send commands for the device to receive and execute.

An SSD is a data storage device that uses integrated circuit assemblies as memory to store data persistently. SSDs have no moving mechanical components, and this feature distinguishes SSDs from traditional electromechanical magnetic disks, such as hard disk drives (HDDs) or floppy disks, which contain spinning disks and movable read/write heads. Compared to electromechanical disks, SSDs are typically more resistant to physical shock, run silently, have lower access time, and less latency.

Many types of SSDs use NAND-based flash memory which retains data without power and includes a type of non-volatile storage technology. Quality of Service (QOS) of an SSD may be related to the predictability of low latency and consistency of high input/output operations per second (IOPS) while servicing read/write input/output (I/O) workloads. This means that the latency or the I/O command completion time needs to be within a specified range without having unexpected outliers. Throughput or I/O rate may also need to be tightly regulated without causing sudden drops in performance level.

The subject matter of this disclosure may be better understood by reference to FIGS. 1-5.

Figure 1:
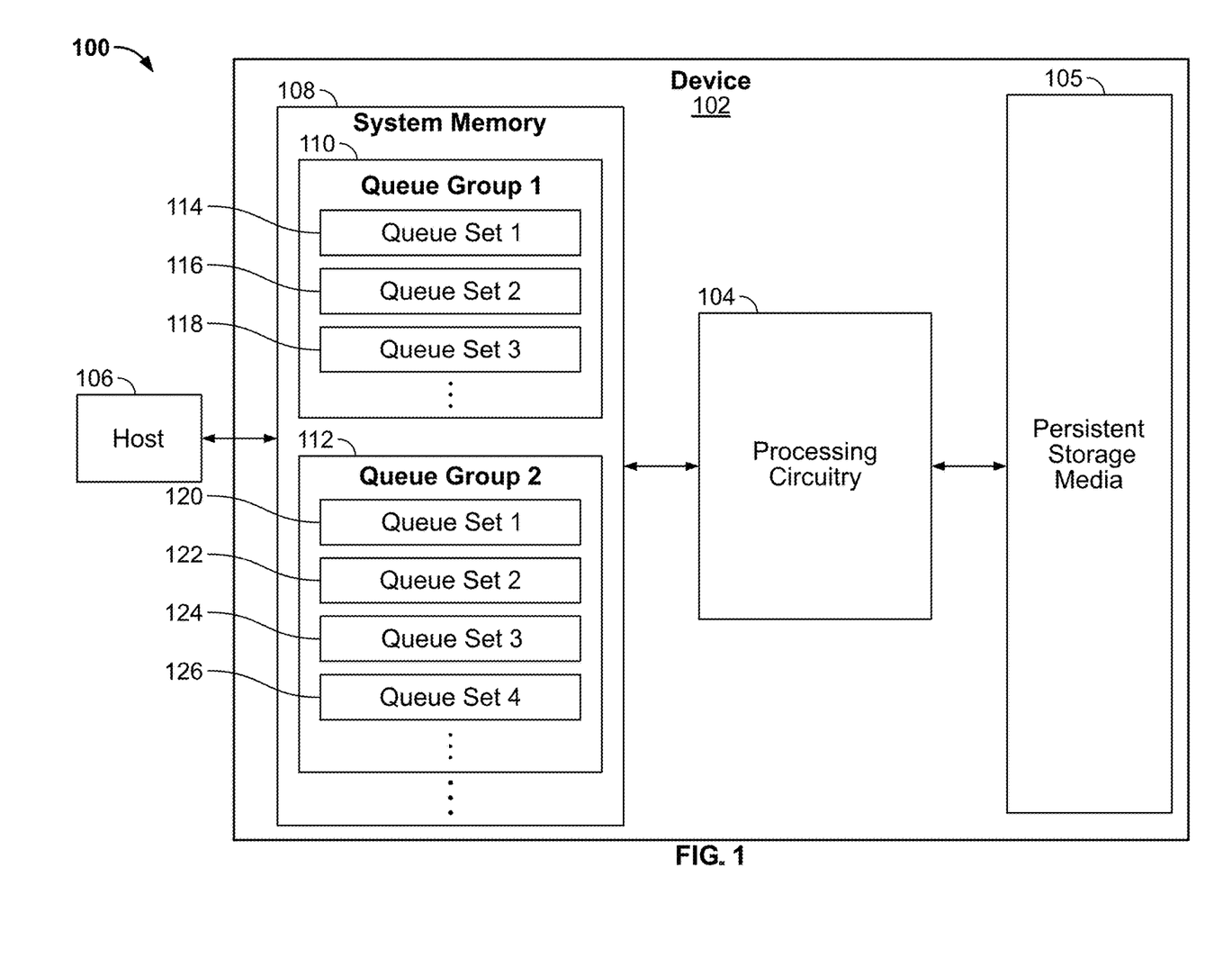
FIG. 1 shows an illustrative diagram of a system that includes a host and a device with processing circuitry and system memory, in accordance with some embodiments of the present disclosure.

FIG. 1 shows an illustrative diagram of a system 100 that includes a host 106 and a device 102 with processing circuitry 104 and system memory 108, in accordance with some embodiments of the present disclosure. In some embodiments, device 102 may be a storage device such as a solid-state storage device (e.g., an SSD device). In some embodiments, processing circuitry 104 may include a processor or any suitable processing unit. In some embodiments, persistent storage media 105 may include non-volatile memory. It will be understood that the embodiments of the present disclosure are not limited to SSDs. For example, in some embodiments, device 102 may include a hard disk drive (HDD) device in addition to or in place of an SSD. In some embodiments, system memory 108 may be implemented as temporary memory (e.g., cache or any suitable volatile memory) including queue groups (e.g., first queue group 110 and second queue group 112) which include at least one queue set (e.g., 114, 116, 118, 120, 124, 126) to store commands received from host 106.

Device 102 is configured to received commands from host 106 and store the commands in system memory 108. System memory 108 is divided into queue groups (e.g., first queue group 110 and second queue group 112), each of which includes at least one queue set (e.g., 114, 116, 118, 120, 124, 126). In some embodiments, each queue set (e.g., 114, 116, 118, 120, 124, 126) includes a submission queue at which to receive and store the received commands from host 106, and a completion queue to store command fetch responses. In some embodiments, a respective command received from host 106 may be stored in a queue group (e.g., first queue group 110 and second queue group 112) based on any one or more of (a) characteristics of the respective command (e.g., type of command and size of command), (b) workload priority associated with the respective command, and (c) frequency at which command is received by device 102. For example, first queue group 110 and its respective queue sets (e.g., 114, 116, and 118) may be configured to receive and store high priority commands from host 106 and second queue group 112 and its respective queue sets (e.g., 120, 122, 124, and 126) are configured to receive and store low priority commands from host 106.

The number of queue groups (e.g., first queue group 110 and second queue group 112) and their respective queue sets (e.g., 114, 116, 118, 120, 124, 126) may be allocated according to any one or more of (a) characteristics of the commands (e.g., type of command and size of command), (b) workload priority associated with the commands, (c) frequency at which commands are received, and (d) available memory of system memory 108. For example, the first queue group 110 may be configured to receive less-frequent, high priority commands from host 106 and the second queue group 112 may be configured to receive more-frequent, low priority commands from host 106. In such an example, the available memory of system memory 108 may be allocated such that the second queue group 112 includes more queue sets than the first queue group 110. In some embodiments, each queue set (e.g., 114, 116, 118, 120, 124, 126) may be of the same allocated memory size. In some embodiments, each queue set (e.g., 114, 116, 118, 120, 124, 126) may be of variable allocated memory size, i.e., some selected queue sets may be of a larger allocated memory size than other queue sets. Although the aforementioned examples described herein and FIG. 1 illustrates system memory 108 with two queue groups (e.g., first queue group 110 and second queue group 112), system memory 108 may include more than two queue groups. Furthermore, although FIG. 1 illustrates each queue group (e.g., first queue group 110 and second queue group 112) with three or four queue sets (e.g., 114, 116, 118, 120, 124, 126), each queue group may include one or more queue sets based on the size of queue sets and the available memory that may be allocated in system memory 108.

In some embodiments, system memory 108 is volatile memory, which may include any one or more volatile memory, such as Static Random Access Memory (SRAM). In some embodiments, volatile memory is configured to temporarily store data (e.g., commands received from host 106 and command fetch responses) while processing circuitry 104 continues to fetch and process commands. In some embodiments, processing circuitry 104 is communicatively coupled to volatile memory to store and access commands received from host 106. In some embodiments, a data bus interface is used to transport commands or command data from volatile memory to processing circuitry 104.

Although FIG. 1 shows each queue group (e.g., first queue group 110 and second queue group 112) in system memory 108, in some embodiments each queue group (e.g., 110 and 112) and each queue set (e.g., 114, 116, 118, 120, 122, 124, and 126), and the associated data (e.g., commands and command fetch responses) of the queue sets is stored in host 106. In some embodiments, host 106 includes host memory to store each queue group (e.g., 110 and 112), their respective queue sets (e.g., 114, 116, 118, 120, 122, 124, and 126) and the associated data (e.g., commands and command fetch responses). In such embodiments, processing circuitry 104 may fetch commands stored in host memory of host 106 in a similar manner to as to fetch commands stored in system memory 108 of the device 102 discussed herein.

The processing circuitry 104 is configured to manage the fetching of commands received from host 106. Processing circuitry 104 is configured to determine an allocated command value indicative of a number of commands that are capable of being fetched from each respective queue group (e.g., 110 and 112). In some embodiments, the allocated command value of a queue group (e.g., 110 and 112) is determined based on an amount of processing resources allocated for fetching commands from each queue group (e.g., 110 and 112). The allocated command value for each queue group (e.g., 110 and 112) may be preset before device 102 receives commands from host 106. In some embodiments, the allocated command value is represented by a number of commands of a particular size in the queue group (e.g., 110 and 112) from which the processing circuitry 104 may fetch commands. In some embodiments, the allocated command value may be indicative of the amount of bandwidth that the processing circuitry 104 is allocated to fetch commands from a respective queue group (e.g., 110 and 112). The allocated command value for a respective queue group (e.g., 110 and 112) is a share of a total command allocation capacity, which is defined as a sum of each allocated command value for each queue group in system memory 108. In some embodiments, each respective queue group (e.g., first queue group 110 and second queue group 112) is allocated with the same allocated command value. In some embodiments, one or more queue groups (e.g., 110 and 112) may have a greater allocated command value than other queue groups in the same system memory 108. In some embodiments, the allocated command value for a respective queue group (e.g., 110 and 112) is updated while the device is in operation, where the allocated command value is updated based on the volume of commands received and stored in the respective queue group (e.g., 110 and 112) or the frequency of receiving commands stored in the respective queue group (e.g., 110 and 112). In some embodiments, the processing circuitry 104 allocates a shared allocated command value in order for the processing circuitry 104 to fetch additional commands from any one or more respective queue group (e.g., 110 and 112), in addition to the allocated command value for each of the one or more respective queue group. The processing circuitry 104 is further configured to determines a number of outstanding commands to be fetched from each respective queue group (e.g., first queue group 110 and second queue group 112). In some embodiments, the number of outstanding commands to be fetched from a respective queue group is determined based on information of at least one command fetch request sent from the processing circuitry 104 to the respective queue group (e.g., 110 and 112). The number of outstanding commands to be fetched may be determined by determining the number of commands stored in queue sets (e.g., 114, 116, 118, 120, 122, 124, and 126) of the respective queue groups (e.g., 110 and 112) which have yet to be fetched but have been included in a command fetch request sent from the processing circuitry 104. In some embodiments, the number of outstanding commands to be fetched may be represented by a number of commands of a particular size in the queue group (e.g., 110 and 112). In some embodiments, the number of outstanding commands to be fetched may be indicative of the amount of bandwidth required to fetch the outstanding commands from the queue group (e.g., 110 and 112) by the processing circuitry 104 based on the data size of the outstanding commands to be fetched. As processing circuitry 104 generates and sends command fetch requests to the system memory 108 to fetch commands from a respective queue group (e.g., 110 and 112), the associated number of outstanding commands to be fetched from the respective queue group (e.g., 110 and 112) increases. In some embodiments, the increase in the outstanding number of commands to be fetched may be based on one or more of the number of commands included in the command fetch requests, the number of commands stored in the respective queue group (e.g., 110 and 112), and the size of the commands stored in the respective queue group (e.g., 110 and 112). Once an outstanding command is fetched from a queue set (e.g., 114, 116, 118, 120, 122, 124, 120) of a respective queue group (e.g., 110 and 112), the associated number of outstanding commands to be fetched from the respective queue group decreases. In some embodiments, this decrease in the outstanding number of commands to be fetched may be based on one or more of the number of commands fetched by the processing circuitry 104 and the size of each command fetched. Once the processing circuitry 104 determines the number of outstanding commands to be fetched from queue group (e.g., 110 and 112), processing circuitry 104 then compares the allocated command value to the number of outstanding commands to be fetched for each respective queue group (e.g., 110 and 112).

The processing circuitry 104 is further configured to compare the allocated command value to the number of outstanding commands to be fetched for the respective queue group (e.g., first queue group 110 and second queue group 112). In some embodiments, when comparing the allocated command value of a respective queue group (e.g., 110 and 112) to the number of outstanding commands to be fetched for the respective queue group (e.g., 110 and 112), the processing circuitry 104 includes at least a portion of the shared allocated command value to the allocated command value of the respective queue group (e.g., 110 and 112). When the processing circuitry 104 determines that the allocated command value is greater than the number of outstanding commands to be fetched for the respective queue group (e.g., 110 and 112), based on the comparison, the processing circuitry 104 designates the respective queue group (e.g., 110 and 112) as an available queue group. The processing circuitry 104 is configured to designate the respective queue group (e.g., 110 and 112) as an available queue group of at least one available queue groups from which at least one command may be fetched. In some embodiments, the respective queue group (e.g., 110 and 112) is designated as an available queue group from which at least one command may be fetched by using a lookup table or any suitable bit mapping to indicate which queue group is available for processing circuitry to send command fetch requests. In some embodiments the lookup table or suitable bit mapping are located in processing circuitry 104. In other embodiments the lookup table or suitable bit mapping are located in system memory 108. When the processing circuitry 104 determines that the allocated command value is less than or equal to the number of outstanding commands to be fetched for the respective queue group (e.g., 110 and 112), processing circuitry 104 will not designate the respective queue group as an available queue group as it does not have any available processing resources to fetch commands from the respective queue group (e.g., 110 and 112). If there are any further queue groups (e.g., 110 and 112) which have not been evaluated by processing circuitry 104, the processing circuitry will evaluate each remaining queue group to determine whether each remaining queue group should be designated as an available queue group.

Once each of the queue groups (e.g., 110 and 112) have been evaluated and at least one queue group has been designated as an available queue group, the processing circuitry 104 is further configured to select a queue group from the available queue groups. In some embodiments, the selection is performed randomly, or in a round-robin manner. In some embodiments, the selection may be based on, in part, a respective priority of each available queue group. In some embodiments, the processing circuitry selects a queue group from the available queue groups based on an associated priority of each available queue group. The processing circuitry 104 then fetches at least one command from the selected queue group. In some embodiments, the processing circuitry 104 sends at least one command fetch request to the system memory 108 to fetch at least one command from the selected queue group. In some embodiments, the processing circuitry 104 fetches at least one command from at least one of the queue sets (e.g., 114, 116, 118, 120, 122, 124, 126) of the selected queue group. In some embodiments, the queue sets (e.g., 114, 116, 118, 120, 122, 124, 126) of the selected queue group from which commands are fetched are determined based on any one or more of associated queue set priorities, the amount of commands stored in each queue set (e.g., 114, 116, 118, 120, 122, 124, 126), or the amount of data stored in each queue set (e.g., 114, 116, 118, 120, 122, 124, 126). The processing circuitry 104 fetches commands which are stored in the submission queue of queue sets (e.g., 114, 116, 118, 120, 122, 124, 126) within the selected queue group. Once a command is fetched from the submission queue, the system memory 108 generates a command fetch response which includes at least one fetched command. The command fetch response may be stored in the corresponding completion queue of the queue set from which the command was fetched. The command fetch response is than sent to the processing circuitry 104 to execute the at least one fetched command. In some embodiments, the command included in the command fetch response is a read command, which includes a memory address from which to access read data in the persistent storage media 105. In other embodiments, the command included in the command fetch response is a write command, which includes write data and a memory address at which to store the write data in persistent storage media 105.

For purposes of brevity and clarity, the features of the disclosure described herein are in the context of a device 102 (e.g., an SSD device) having processing circuitry 104 and system memory 108. However, the principles of the present disclosure may be applied to any other suitable context in which a device receives and stores commands from a host and fetches the commands for execution. The device 102 may include processing circuitry 104 and system memory 108, which are communicatively coupled to each other by network buses or interfaces. In some embodiments, the device receives commands from a host 106 through a port. In some embodiments, the device may receive commands from multiple hosts. In some embodiments, the commands are sent from any of the hosts (e.g., host 106) to the device via a network bus or interface.

Device 102 receives commands from host 106 through a port, where the host and the port are communicatively coupled by the network bus. The network bus may transport commands and data between host 106 and device 102. The network bus may transport commands and data using a Non-Volatile Memory Express (NVMe), Peripheral Component Interconnect Express (PCIe), or any other suitable network protocol.

Additionally, device 102 includes persistent storage media 105. Persistent storage media 105 may also be hereinafter referred to as main memory of device 102. In some embodiments, persistent storage media 105 includes any one or more of a non-volatile memory, such as Phase Change Memory (PCM), a PCM and switch (PCMS), a Ferroelectric Random Access Memory (FeRAM), or a Ferroelectric Transistor Random Access Memory (FeTRAM), a Memristor, a Spin-Transfer Torque Random Access Memory (STT-RAM), and a Magnetoresistive Random Access Memory (MRAM), any other suitable memory, or any combination thereof. In some embodiments, persistent storage media 105 includes memory of a memory density, the memory density is any one of (a) single-level cell (SLC) memory density, (b) multi-level cell (MLC) memory density, (c) tri-level cell (TLC) memory density, (d) quad-level cell (QLC) memory density, (e) penta-level cell (PLC) memory density, or (f) a memory density of greater than 5 bits per memory cell. Processing circuitry 104 is communicatively coupled to persistent storage media 105 to store and access data in memory blocks or pages of persistent storage media 105. In some embodiments, a data bus interface is used to transport data transfer requests or data. In some embodiments, the data bus interface includes a data transfer request bus and a data interface. In some embodiments, persistent storage media 105 includes multiple memory die. In some embodiments, persistent storage media 105 includes multiple bands of memory, each band spanning across each memory die. In some embodiments, persistent storage media 105 may be accessed (e.g., read or written to) using direct memory access (DMA) by the processing circuitry 104. In such embodiments, the processing circuitry 104 includes a processor to fetch and execute commands, and a memory controller (e.g., a DMA controller) to process and perform DMA transfers independent of the execution of instructions by the processor.

In some embodiments, the processor or processing unit of processing circuitry 104 may include a hardware processor, a software processor (e.g., a processor emulated using a virtual machine), or any combination thereof. The processor may include any suitable software, hardware, or both for controlling system memory 108, persistent storage media 105, and processing circuitry 104 while fetching and executing commands. In some embodiments, device 102 may further include a multi-core processor. In some embodiments, processing circuitry 104 includes a memory controller (e.g., direct memory access (DMA) controller), which may include any suitable software, hardware, or both for accessing persistent storage media 105 independent of the processor which fetches and executes commands. Persistent storage media 105 may also include hardware elements for non-transitory storage of instructions, commands, or requests.

In some embodiments, device 102 may be a storage device (for example, SSD device) which may include one or more packages of memory dies (e.g., persistent storage media 105), where each die includes storage cells. In some embodiments, the storage cells are organized into pages or super pages, such that pages and super pages are organized into blocks. In some embodiments, each storage cell can store one or more bits of information.

For purposes of clarity and brevity, and not by way of limitation, the present disclosure is provided in the context of managing the fetching and execution of commands received from a host. The process of managing the fetching and execution of commands received from a host may be configured by any suitable software, hardware, or both for implementing such features and functionalities. Managing the fetching and execution of commands received from a host may be at least partially implemented in, for example, device 102 (e.g., as part of processing circuitry 104, or any other suitable device). For example, for a solid-state storage device (e.g., device 102), managing the fetching and execution of commands received from a host may be implemented in processing circuitry 104. Managing the fetching and execution of commands received from a host may reduce processing latency for certain (e.g., high priority) commands and reduce QoS degradation. The reduced processing latency for certain commands and reduced QOS degradation results in an improved performance speed of device 102 to fetch commands and process commands to access persistent storage media 105 while processing circuitry 104 concurrently executes commands.

Figure 2:
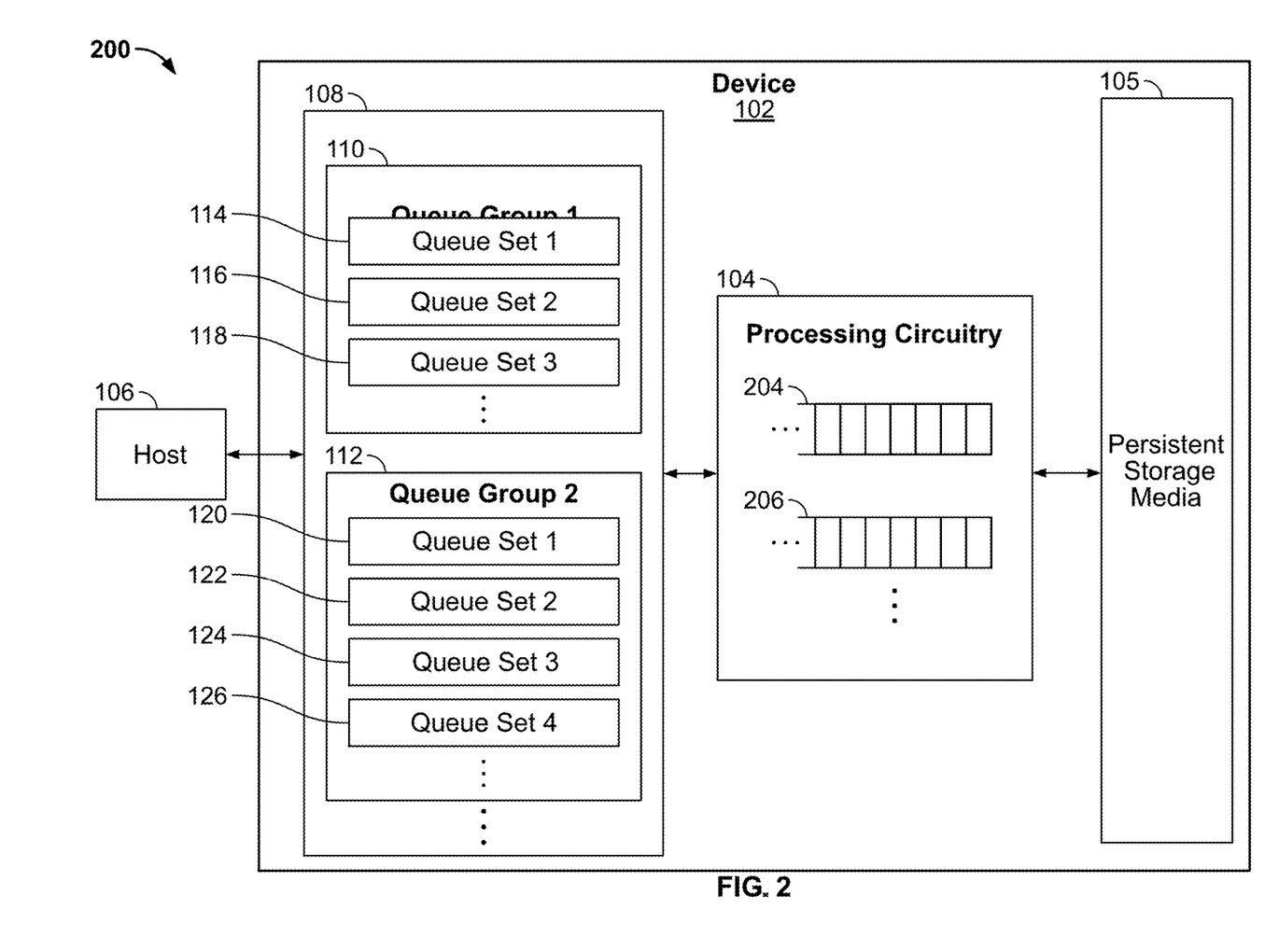
FIG. 2 shows an illustrative diagram of another implementation of the device of FIG. 1 with command execution queues, in accordance with some embodiments of the present disclosure.

FIG. 2 shows an illustrative diagram of another implementation of the device 102 of FIG. 1 with command execution queues (e.g., first command execution queues 204 and second command execution queue 206), in accordance with some embodiments of the present disclosure. Once processing circuitry 104 fetches a command from a respective queue group (e.g., 110 and 112), the fetched command is temporarily stored in a command execution queue (e.g., 204 and 206) until processing circuitry 104 accesses at least one command from the command execution queue (e.g., 204, 206) for execution. Although FIG. 2 shows two command execution queues (e.g., 204 and 206), device 102 may include more than two command execution queues. The first command execution queue 204 is associated with the first queue group 110, and the second command execution queue 206 is associated with the second queue group 112. For each respective additional queue group (e.g., a third queue group), device 102 includes a corresponding additional command execution queue (e.g., a third command execution queue). Each respective command execution queue (e.g., 204 and 206) is configured to temporarily store fetched commands from a queue group (e.g., 110 and 112) which corresponds to the respective command execution queue (e.g., 204 and 206). In some embodiments, command execution queues (e.g., 204 and 206) are implemented in processing circuitry 104. In some embodiments, command execution queues (e.g., 204 and 206) may be implemented as any first-in first-out data structure (e.g., queue).

Processing circuitry 104 is configured to determine whether a respective number of commands in the respective command execution queue (e.g., first command execution queue 204 and second command execution queue 206) exceeds a threshold. In some embodiments the threshold value may be configured based on a constant threshold value for each command execution queue (e.g., 204 and 206). In some embodiments, each command execution queue (e.g., 204 and 206) has a respective threshold, where each respective threshold is not necessarily the same value. In some embodiments, the threshold of a respective command execution queue (e.g., 204 and 206) is determined based on an amount of processing resources allocated for executing commands from the queue group (e.g., 110 and 112) associated with the respective command execution queue (e.g., 204 and 206). The threshold for each command execution queue (e.g., 204 and 206) may be preset before the device 102 receives commands from host 106. In some embodiments, the threshold may be represented by a number of commands of a particular size in the command execution queue (e.g., 204 and 206) from which the processing circuitry 104 may access a command for execution. In some embodiments, the threshold may be indicative of the amount of data stored in a respective command execution queue (e.g., 204 and 206) at which the processing circuitry 104 should pause accessing commands for execution. The threshold for a respective command execution queue (e.g., 204 and 206) may be determined by a share of a total processing resources for executing commands, which is defined by the processing capabilities of a processor or a memory controller (e.g., DMA controller) of the processing circuitry 104.

In some embodiments, each respective command execution queue (e.g., 204 and 206) is allocated with the same amount of processing resources, and therefore the same threshold is implemented within each command execution queue (e.g., 204 and 206). In some embodiments, one or more command execution queue may have a greater threshold than other command execution queues. The processing circuitry 104 compares the number of commands stored in the respective command execution queue (e.g., 204 and 206) to determine whether a respective number of commands in the respective command execution queue (e.g., 204 and 206) exceeds the respective threshold of the respective command execution queue (e.g., 204 and 206). As processing circuitry 104 accesses commands from a respective command execution queue (e.g., 204 and 206), the number of commands stored in the respective command execution queue (e.g., 204 and 206) decreases by the number of commands accessed. As more commands are fetched, by processing circuitry 104, from a queue group (e.g., 110 and 112) that corresponds to the respective command execution queue (e.g., 204 and 206), the number of commands stored in the respective command execution queue (e.g., 204 and 206) increase by the number of commands fetched. When the respective number of commands in the respective command execution queue (e.g., 204 and 206) does not exceed the threshold, processing circuitry designates the respective command execution queue (e.g., 204 and 206) as an available command execution queue. The processing circuitry 104 is configured to designate the respective command execution queue (e.g., 204 and 206) as an available command execution queue of at least one available command execution queues from which at least one command may be accessed for execution. In some embodiments, the respective command execution queue (e.g., 204 and 206) is designated as an available command execution queue from which at least one command may be accessed by using a lookup table or any suitable bit mapping to indicate which command execution queue is available for processing circuitry to access commands for execution. In some embodiments, when the respective number of commands in the respective command execution queue (e.g., 204 and 206) exceeds the threshold, the processing circuitry 104 pauses accessing commands stored in the respective command execution queue (e.g., 204 and 206), as to reduce strain on processing resources allocated for the respective command execution queue (e.g., 204 and 206) for executing commands. If there are any further command execution queues (e.g., 204 and 206) which have not been evaluated by processing circuitry 104, the processing circuitry will evaluate each remaining command execution queue to determine whether each remaining command execution queue should be designated as an available command execution queue.

Once each of the command execution queues (e.g., 204 and 206) have been evaluated and at least one command execution queue has been designated as an available command execution queue, the processing circuitry 104 is further configured to select a command execution queue group from the available command execution queue. The processing circuitry 104 selects a command execution queue (e.g., 204 and 206) from the available command execution queues. In some embodiments, the selection is random, or based on a round-robin method. In some embodiments, the selection may be based on, in part, a respective priority of each available command execution queue. In some embodiments, the selection is performed randomly, or in a round-robin manner. In some embodiments, the selection may be based on, in part, a respective priority of each available command execution queue. In some embodiments, the processing circuitry 104 is configured to select a command execution queue (e.g., 204 and 206) from the available command execution queues based on an associated priority of each available command execution queue. Once the processing circuitry 104 selects the command execution queue, the processing circuitry 104 accesses at least one command from the selected command execution queue. When a command is accessed from the selected command execution queue, the processing circuitry causes the command to be executed. As processing circuitry 104 accesses commands from a respective command execution queue (e.g., 204 and 206), the number of commands stored in the respective command execution queue (e.g., 204 and 206) decreases by the number of commands accessed. In some embodiments, the processing circuitry 104 includes a multi-core processor, which executes accessed commands in parallel. In some embodiments, at least one accessed command is a DMA command, which is executed by a DMA controller or any other suitable, standalone processor to execute the DMA command.

Figure 3:
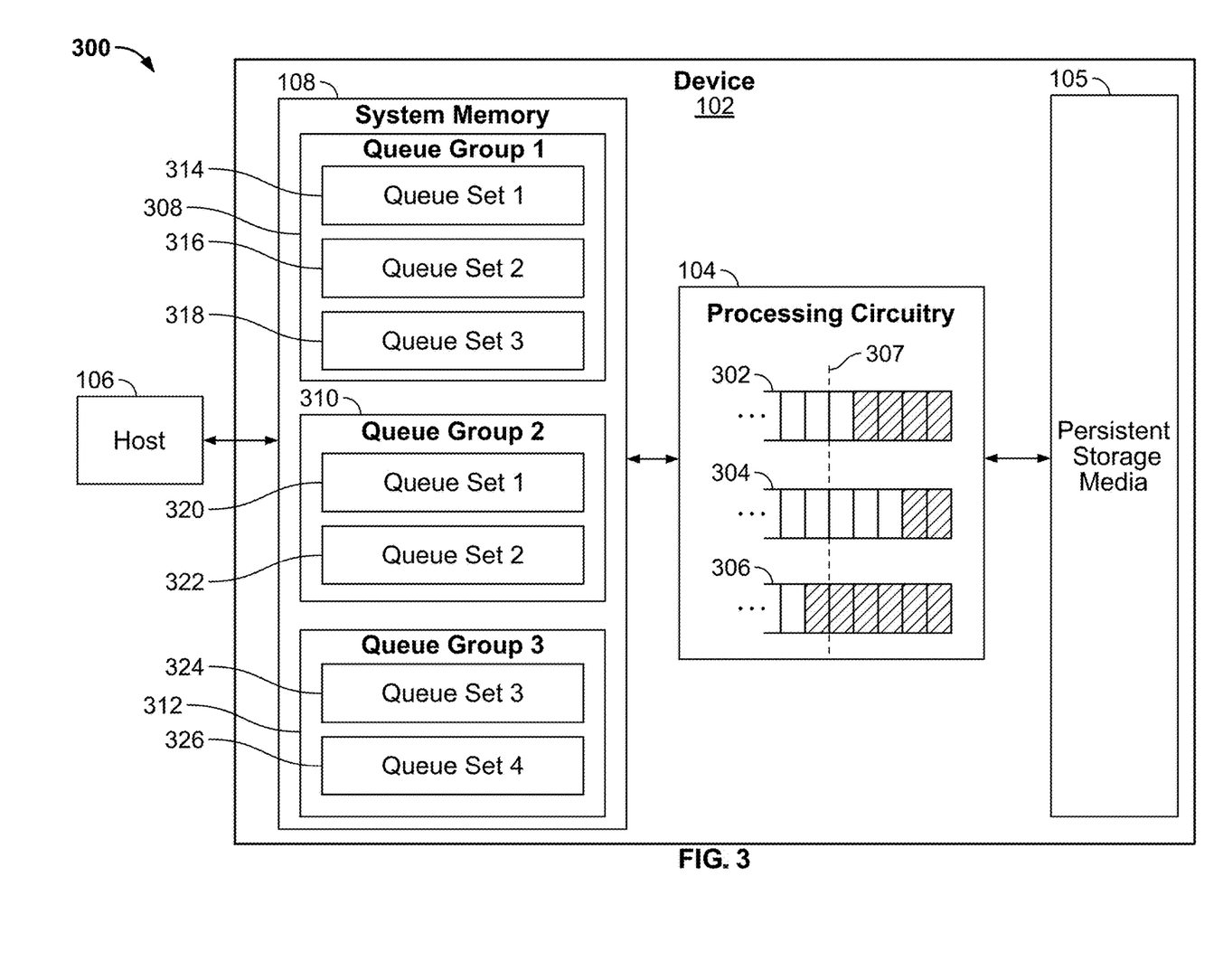
FIG. 3 shows an illustrative diagram of an implementation of the device of FIG. 2 managing example commands received from the host, in accordance with some embodiments of the present disclosure.

FIG. 3 shows an illustrative diagram of an implementation of the device of FIG. 2 managing example commands received from the host, in accordance with some embodiments of the present disclosure. In the example device 102 provided in FIG. 3, system memory 108 includes a first queue group 308 including three queue sets (e.g., 314, 316, and 318), a second queue group 310 including two queue sets (e.g., 320 and 322), and a third queue group 312 including queue sets (e.g., 324 and 326). Therefore, the processing circuitry 104 is implemented with three command execution queues (e.g., first command execution queue 302, second command execution queue 304, and third command execution queue 306). Each command execution queue (e.g., 302, 304, 306) includes threshold 307.

In some embodiments the threshold 307 may be configured based on a constant threshold value for each command execution queue (e.g., 302, 304, and 306). In some embodiments, each command execution queue (e.g., 302, 304, and 306) has a respective threshold (e.g., threshold 307), where each respective threshold is not necessarily the same value. In some embodiments, the threshold 307 of a respective command execution queue (e.g., 302, 304, 306) is determined based on an amount of processing resources allocated for executing commands from the queue group (e.g., 308, 310, 312) associated with the respective command execution queue (e.g., 302, 304, 306). In some embodiments, the threshold 307 may be represented by a number of commands of a particular size in the command execution queue (e.g., 302, 304, 306) from which the processing circuitry 104 may access a command for execution. In some embodiments, the threshold 307 is indicative of the amount of data stored in a respective command execution queue (e.g., 302, 304, 306) at which the processing circuitry 104 should pause accessing commands for execution. The threshold 307 for a respective command execution queue (e.g., 302, 304, 306) may be determined by a share of a total processing resources for executing commands, which is defined by the processing capabilities of a processor or a memory controller (e.g., DMA controller) of the processing circuitry 104. In some embodiments, each respective command execution queue (e.g., 302, 304, 306) is allocated with the same amount of processing resources, and therefore the same threshold 307 is implemented within each command execution queue (e.g., 302, 304, 306). In some embodiments, one or more command execution queue (e.g., 302, 304, 306) may have a greater threshold than other command execution queues.

For device 102 illustrated in FIG. 3, the first command execution queue 302 has four commands, the second command execution queue 304 has two commands, and the third command execution queue 306 has six commands. The threshold 307 for each of the command execution commands (e.g., 302, 304, and 306) is configured as five commands. The processing circuitry 104 evaluates each of the command execution queues (e.g., 302, 304, and 306) by comparing the respective number of commands in each command execution queue (e.g., 302, 304, and 306) to the threshold 307. Each of the first command execution queue 302 and the second command execution queue 304 includes fewer stored commands than the threshold 307, indicating that processing circuitry 104 has available processing resources to access and execute the commands stored in the first command execution queue 302 and second command execution queue 304. Processing circuitry 104 designates each of the first command execution queue 302 and second command execution queue 304 as available command execution queues from which processing circuitry 104 may access commands for execution. Processing circuitry 104 may also determine that the number of commands in third command execution queue 306 is greater than or equal to threshold 307, and therefore processing circuitry 104 pauses the accessing of commands stored in third command execution queue 306.

The processing circuitry 104 then selects a command execution queue from the available command execution queues (e.g., first command execution queue 302 and second command execution queue 304). In some embodiments, the selection is random, or based on a round-robin method. In some embodiments, the selection may be based on, in part, a respective priority of each available command execution queue (e.g., first command execution queue 302 and second command execution queue 304). For example, if the first queue group 308 and first command execution queue 302 are configured to store high priority commands, and the second queue group 310, second command execution queue 304, third queue group 312, and third command execution queue 306 are configured to store low priority commands, processing circuitry may access the commands of the first command execution queue 302 based on each respective priority of the command execution commands. In some embodiments, the selection is performed randomly, or in a round-robin manner. The processing circuitry 104 accesses at least one command from the first command execution queue 302. While processing circuitry 104 accesses commands in first command execution queue 302, processing circuitry may also fetch other commands from any one or more of the first queue group 308, second queue group 310, and third queue group 312 and store the commands in their respective corresponding command execution queue (e.g., 302, 304, 306). As processing circuitry 104 accesses commands from the first command execution queue 302, the number of commands stored in the first command execution queue 302 decreases by the number of commands accessed. Once the processing circuitry 104 has completed accessing commands stored in first command execution queue 302, or there are no longer any stored commands in the first command execution queue 302, processing circuitry may then reevaluate each of the command execution queues (e.g., 302, 304, and 306) to determine an updated set of available command execution queues to access further commands for execution.

Figure 4:
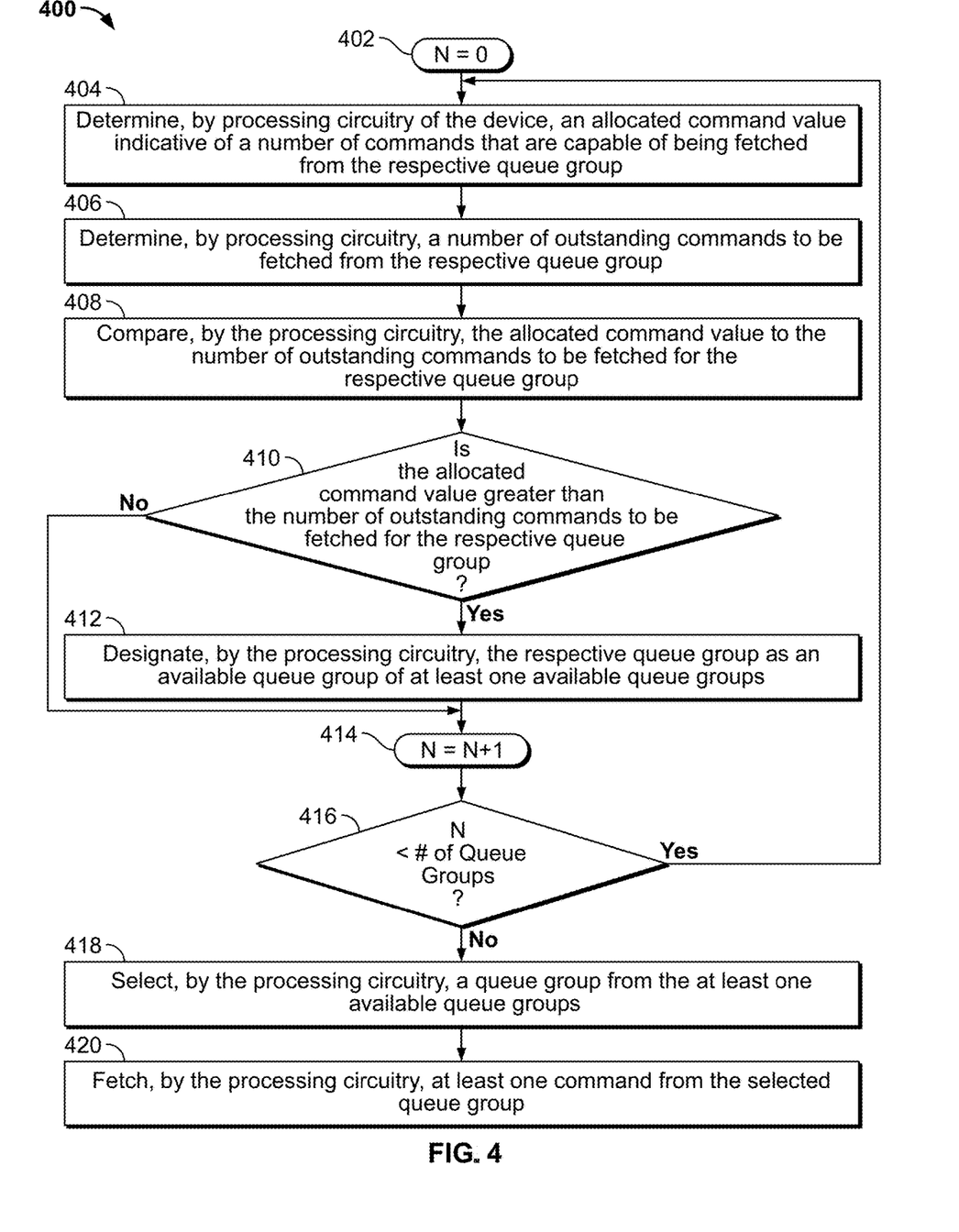
FIG. 4 shows a flowchart of illustrative steps of a process for managing command fetches for a device, in accordance with some embodiments of the present disclosure.

FIG. 4 shows a flowchart of illustrative steps of a process 400 for managing command fetches for a device, in accordance with some embodiments of the present disclosure. In some embodiments, the referenced system, device, processing circuitry, persistent storage media, host, system memory, queue groups, and queue sets may be implemented/represented as system 100, device 102, processing circuitry 104, persistent storage media 105, host 106, system memory 108, queue groups (e.g., 110, 112), and queue sets (e.g., 114, 116, 118, 120, 122, 124, 126). In some embodiments, process 400 can be modified by, for example, having steps rearranged, changed, added, and/or removed.

At step 402, process 400 initializes counter N to 0, as following steps 404-416 form a loop to evaluate each queue group allocated in the system memory of the device. This step 402, along with steps 414 and 416 are illustrated to indicate that counter N may be updated or compared to other values in order to proceed to other steps. Although FIG. 4 shows counter N used for process 400, a counter N is not necessarily implemented in device for processing circuitry to evaluate each of the queue groups allocated in system memory. Once counter N is initialized, process 400 proceeds to step 404.

At step 404, the processing circuitry determines an allocated command value indicative of a number of commands that are capable of being fetched from the respective queue group (e.g., queue group N). In some embodiments, the allocated command value of a queue group is determined based on an amount of processing resources allocated for fetching commands from the queue group. The allocated command value for each queue group may be preset before the device receives commands from a host. In some embodiments, the allocated command value may be represented by a number of commands of a particular size in the queue group from which the processing circuitry may fetch commands. In some embodiments, the allocated command value may be indicative of the amount of bandwidth that the processing circuitry is allocated to fetch commands from a queue group. The allocated command value for a respective queue group is a share of a total command allocation capacity, which is defined as a sum of each allocated command value for each queue group in system memory. In some embodiments, each respective queue group is allocated with the same allocated command value. In some embodiments, one or more queue groups may have a greater allocated command value than other queue groups in the same system memory. In some embodiments, the allocated command value for a respective queue group (e.g., queue group N) may be updated while the device is in operation, where the allocated command value is updated based on the volume of commands received and stored in the respective queue group or the frequency of receiving commands stored in the respective queue group. In some embodiments, the processing circuitry allocates a shared allocated command value in order for the processing circuitry to fetch additional commands from any one or more respective queue group, in addition to the allocated command value for each of the one or more respective queue group. Once the processing circuitry determines the allocated command value indicative of a number of commands that are capable of being fetched from the respective queue group, the processing circuitry then determines a number of outstanding commands to be fetched from the respective queue group, at step 406.

At step 406, the processing circuitry determines a number of outstanding commands to be fetched from the respective queue group (e.g., queue group N). In some embodiments, the number of outstanding commands to be fetched from a respective queue group is determined based on information of at least one command fetch request sent from the processing circuitry to the respective queue group. The number of outstanding commands to be fetched may be determined by determining the number of commands stored in queue sets of the respective queue group which have yet to be fetched but have been included in a command fetch request sent from the processing circuitry. In some embodiments, the number of outstanding commands to be fetched may be represented by a number of commands of a particular size in the queue group. In some embodiments, the number of outstanding commands to be fetched may be indicative of the amount of bandwidth required to fetch the outstanding commands from the queue group by the processing circuitry based on the data size of the outstanding commands to be fetched. As processing circuitry generates and sends command fetch requests to the system memory to fetch commands from a respective queue group, the associated number of outstanding commands to be fetched from the respective queue group increases. In some embodiments, the increase in the outstanding number of commands to be fetched may be based on one or more of the number of commands included in the command fetch requests, the number of commands stored in the respective queue group, and the size of the commands stored in the respective queue group. Once an outstanding command is fetched from a queue set of a respective queue group, the associated number of outstanding commands to be fetched from the respective queue group decreases. In some embodiments, this decrease in the outstanding number of commands to be fetched may be based on one or more of the number of commands fetched by the processing circuitry and the size of each command fetched. Once the processing circuitry determines the number of outstanding commands to be fetched from queue group N, processing circuitry then compares the allocated command value to the number of outstanding commands to be fetched for the respective queue group (e.g., queue group N), at step 408.

At step 408, the processing circuitry compares the allocated command value to the number of outstanding commands to be fetched for the respective queue group (e.g., queue group N). In some embodiments, when comparing the allocated command value of a respective queue group to the number of outstanding commands to be fetched for the respective queue group, the processing circuitry may include at least a portion of the shared allocated command value to the allocated command value of the respective queue group. The processing circuitry then proceeds to step 410, to determine the next step of process 400 based on the comparison performed at step 408.

At step 410, the processing circuitry determines whether the allocated command value is greater than the number of outstanding commands to be fetched for the respective queue group (e.g., queue group N), based on the comparison made at step 410. When the allocated command value is greater than the number of outstanding commands to be fetched for the respective queue group, process 400 proceeds to step 412 for the processing circuitry to designate the respective queue group as an available queue group. When the allocated command value is less than or equal to the number of outstanding commands to be fetched for the respective queue group, process 400 proceeds to step 414 to increment counter N.

At step 412, the processing circuitry designates the respective queue group (e.g., queue group N) as an available queue group of at least one available queue groups from which at least one command may be fetched. In some embodiments, the respective queue group is designated as an available queue group from which at least one command may be fetched by using a lookup table or any suitable bit mapping to indicate which queue group is available for processing circuitry to send command fetch requests. Once the processing circuitry designates the respective queue group as an available queue group, process 400 then proceeds to step 414 to increment counter N.

At step 414, counter N is incremented by one value. Counter N is incremented in order for processing circuitry to evaluate another queue group of the system memory. Once counter N is incremented, process 400 then proceeds to step 416 to determine whether there are further queue groups to be evaluated.

At step 416, counter N is compared to the number of queue groups allocated in system memory. This comparison is indicative of whether there is at least one queue group which has yet to be evaluated by steps 404-412. When counter N is less than the number of queue groups, process 400 proceeds to step 404 in order to evaluate another respective queue group (e.g., queue group N+1). When counter N is greater than or equal to the number of queue groups, each of the queue groups in system memory have been evaluated and process 400 proceeds to step 418 to select a queue group from the available queue groups which had been designated at each iteration of step 412.

At step 418, the processing circuitry selects a queue group from the available queue groups. In some embodiments, the selection is performed randomly, or in a round-robin manner. In some embodiments, the selection may be based on, in part, a respective priority of each available queue group. In some embodiments, the processing circuitry selects a queue group from the available queue groups based on an associated priority of each available queue group. Once the processing circuitry selects a queue group, processing circuitry is then to fetch at least one command from the selected queue group, at step 420.

At step 420, the processing circuitry fetches at least one command from the selected queue group. The processing circuitry sends at least one command fetch request to the system memory to fetch at least one command from the selected queue group. In some embodiments, the processing circuitry fetches at least one command from at least one of the queue sets of the selected queue group. In some embodiments, the queue sets of the selected queue group from which commands are fetched are determined based on any one or more of associated queue set priorities, the number of commands stored in each queue set, or the amount of data stored in each queue set. The processing circuitry fetches commands which are stored in the submission queue of queue sets within the selected queue group. Once a command is fetched from the submission queue, the system memory generates a command fetch response which includes at least one fetched command. The command fetch response may be stored in the corresponding completion queue of the queue set from which the command was fetched. The command fetch response is than sent to the processing circuitry to execute the at least one fetched command.

Figure 5:
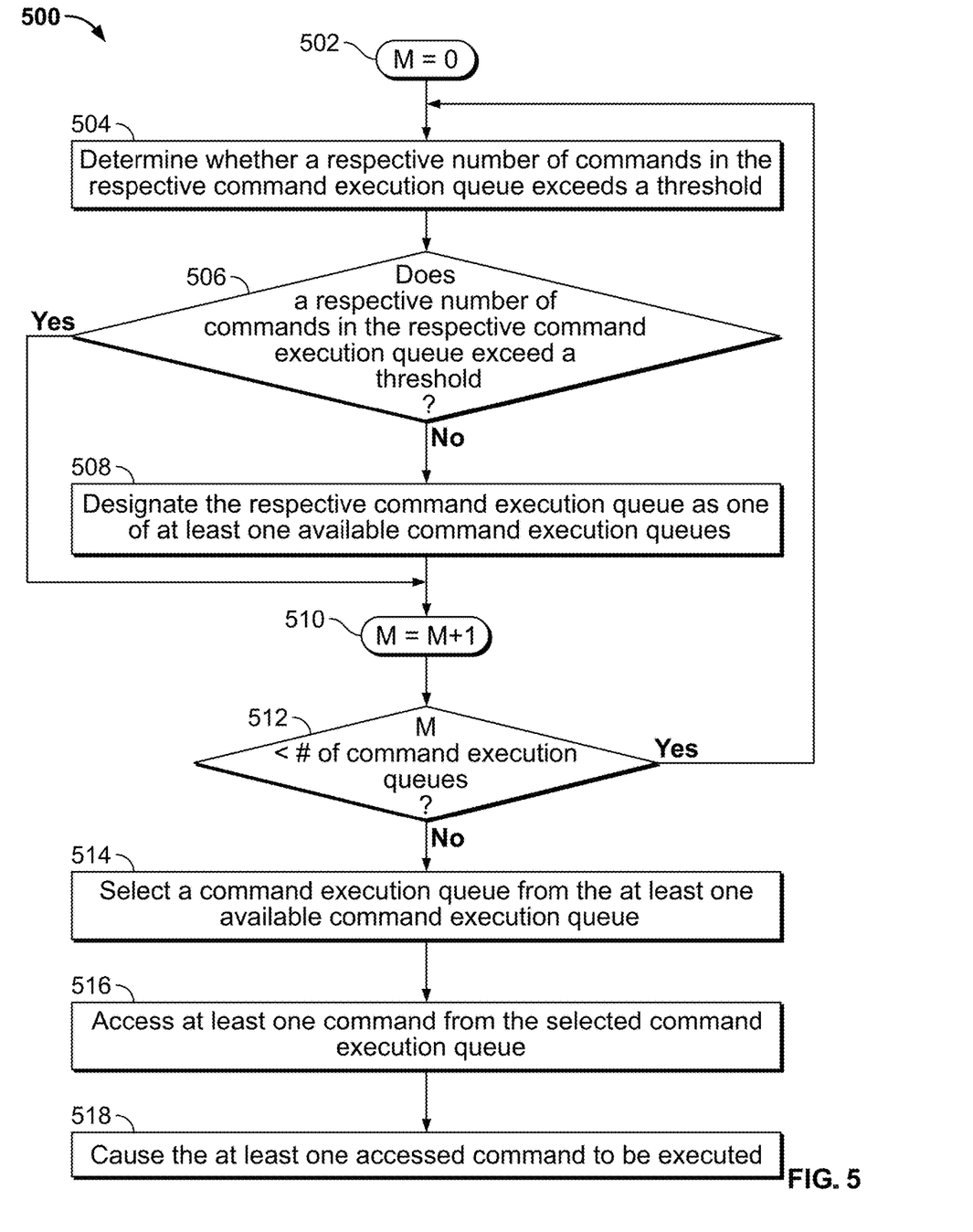
FIG. 5 shows a flowchart of illustrative steps of a process for managing command execution on a device, in accordance with some embodiments of the present disclosure.

FIG. 5 shows a flowchart of illustrative steps of a process 500 for managing command execution on a device, in accordance with some embodiments of the present disclosure. In some embodiments, the referenced system, device, processing circuitry, persistent storage media, host, system memory, queue groups, queue sets, and command execution queues may be implemented/represented as system 100, device 102, processing circuitry 104, persistent storage media 105, host 106, system memory 108, queue groups (e.g., 110, 112), queue sets (e.g., 114, 116, 118, 120, 122, 124, 126), and command execution queues (e.g., 204, 206). In some embodiments, process 500 can be modified by, for example, having steps rearranged, changed, added, and/or removed.

At step 502, process 500 initializes counter M to 0, as following steps 504-512 form a loop to evaluate each command execution queue allocated in the device. Step 502, along with steps 510 and 512 are illustrated to indicate that counter M may be updated or compared to other values in order to proceed to other steps. Although FIG. 5 shows counter M used for process 500, a counter M is not necessarily implemented in device for processing circuitry to evaluate each of the command execution queue allocated for the device. In some embodiments, each respective queue group allocated in system memory is associated with a corresponding command execution queue at which commands fetched from the respective queue group are temporarily stored until execution by processing circuitry. Once counter M is initialized, process 500 proceeds to step 504.

At step 504, the processing circuitry determines whether a respective number of commands in the respective command execution queue (e.g., command execution queue M) exceeds a threshold. In some embodiments the threshold value may be configured based on a constant threshold value for each command execution queue. In some embodiments, each command execution queue has a respective threshold, where each respective threshold is not necessarily the same value. In some embodiments, the threshold of a respective command execution queue is determined based on an amount of processing resources allocated for executing commands from the queue group associated with the respective command execution queue. The threshold for each command execution queue may be preset before the device receives commands from a host. In some embodiments, the threshold may be represented by a number of commands of a particular size in the command execution queue from which the processing circuitry may access a command for execution. In some embodiments, the threshold may be indicative of the amount of data stored in a respective command execution queue at which the processing circuitry should pause accessing commands for execution. The threshold for a respective command execution queue may be determined by a share of a total processing resources for executing commands, which is defined by the processing capabilities of a processor or a memory controller (e.g., DMA controller) of the processing circuitry. In some embodiments, each respective command execution queue is allocated with the same amount of processing resources, and therefore the same threshold is implemented within each command execution queue. In some embodiments, one or more command execution queue may have a greater threshold than other command execution queues. The processing circuitry compares the number of commands stored in the respective command execution queue to determine whether a respective number of commands in the respective command execution queue exceeds the respective threshold of the respective command execution queue. As processing circuitry accesses commands from a respective command execution queue, the number of commands stored in the respective command execution queue decreases by the number of commands accessed. As more commands are fetched, by processing circuitry, from a queue group that corresponds to the respective command execution queue, the number of commands stored in the respective command execution queue increase by the number of commands fetched. Once the processing circuitry determines whether the respective number of commands in the respective command execution queue (e.g., command execution queue M), process 500 then proceeds to step 506 to determine the next step of process 500 based on the determination performed at step 504.

At step 506, the processing circuitry determines whether the respective number of commands in the respective command execution queue (e.g., command execution queue M) exceeds the threshold based on the determination made at step 504. When the respective number of commands in the respective command execution queue does not exceed the threshold, process 500 proceeds to step 508 for the processing circuitry to designate the respective command execution queue (e.g., command execution queue M) as an available command execution queue. When the respective number of commands in the respective command execution queue exceeds the threshold, process 500 proceeds to step 510 to increment counter M.

At step 508, the processing circuitry designates the respective command execution queue (e.g., command execution queue M) as an available command execution queue of at least one available command execution queues from which at least one command may be accessed for execution. In some embodiments, the respective command execution queue is designated as an available command execution queue from which at least one command may be accessed by using a lookup table or any suitable bit mapping to indicate which command execution queue is available for processing circuitry to access commands for execution. Once the processing circuitry designates the respective command execution queue as an available command execution queue, process 500 then proceeds to step 510 to increment counter M.

At step 510, counter M is incremented by one value. Counter M is incremented in order for processing circuitry to evaluate another command execution queue of the device. Once counter M is incremented, process 500 then proceeds to step 512 to determine whether there are further command execution queues to be evaluated.

At step 512, counter M is compared to the number of command execution queues allocated in the device. This comparison is indicative of whether there is at least one command execution queue which has yet to be evaluated by steps 504-508. When counter M is less than the number of command execution queues, process 500 proceeds to step 504 in order to evaluate another respective command execution queue (e.g., command execution queue M+1). When counter M is greater than or equal to the number of command execution queues, process 500 proceeds to step 514 to select a command execution queue from the available command execution queues designated at step 508.

At step 514, the processing circuitry selects a command execution queue from the available command execution queues. In some embodiments, the selection is random, or based on a round-robin method. In some embodiments, the selection may be based on, in part, a respective priority of each available command execution queue. In some embodiments, the selection is performed randomly, or in a round-robin manner. In some embodiments, the selection may be based on, in part, a respective priority of each available command execution queue. In some embodiments, the processing circuitry selects a command execution queue from the available command execution queues based on an associated priority of each available command execution queue. The processing circuitry is then to access at least one command from the selected command execution queue, at step 516.

At step 516, the processing circuitry accesses at least one command from the selected command execution queue. The processing circuitry accesses at least one command from the selected command execution queue. As processing circuitry accesses commands from a respective command execution queue, the number of commands stored in the respective command execution queue decreases by the number of commands accessed. Once the processing circuitry accesses the at commands from the selected command execution queue, processing circuitry then causes the accessed commands to be executed, at step 518.

At step 518, the processing circuitry causes the commands accessed at step 516 to be executed by processing circuitry. In some embodiments, the processing circuitry includes a multi-core processor, which executes accessed commands in parallel. In some embodiments, at least one accessed command is a DMA command, which is executed by a DMA controller or any other suitable, standalone processor to execute the DMA command.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A device comprising:
    system memory for storing at least two queue groups, wherein each of the at least two queue groups comprises respective commands; and
    processing circuitry to:
        for each respective queue group of the at least two queue groups:
            determine an allocated command value indicative of a number of commands that are capable of being fetched from the respective queue group;
            determine a number of outstanding commands to be fetched from the respective queue group;

compare the allocated command value to the number of outstanding commands to be fetched for the respective queue group; and in response to a determination that the allocated command value is greater than the number of outstanding commands to be fetched for the respective queue group based on the comparing:
designate the respective queue group as an available queue group of at least one available queue groups;

select a queue group from the at least one available queue groups; and fetch at least one command from the selected queue group.

2. The device of claim 1, further comprising persistent storage media and at least one command execution queue, wherein each command execution queue corresponds to a queue group and each command execution queue is configured to store at least one fetched command, and wherein the processing circuitry is further to:
for each respective command execution queue of the at least one command execution queue:
determine whether a respective number of commands in the respective command execution queue exceeds a threshold; and
in response to the determination that the respective number of commands stored in the respective command execution queue exceeds the threshold:
designate the respective command execution queue as one of at least one available command execution queues;

select a command execution queue from the at least one available command execution queue;

access at least one command from the selected command execution queue; and cause the at least one accessed command to be executed.

3. The device of claim 2, wherein each command execution queue of the at least one command execution queue has a respective threshold, and each threshold of a respective command execution queue is set based on persistent storage media resource allocation for each queue group associated to the respective command execution queue.

4. The device of claim 1, wherein:
each allocated command value for each respective queue group of the at least two queue groups is configurable; and
each allocated command value for each respective queue group of the at least two queue groups is a share of a total command allocation capacity of the device.

5. The device of claim 4, wherein the processing circuitry is further to set a shared allocated command value that is a share of the total command allocation capacity of the device, and wherein the shared allocate command value may be used by any one or more queue group for which a respective number of outstanding commands is greater than a respective allocated command value.

6. The device of claim 1, wherein each queue group of the at least two queue groups has a respective priority; and
wherein to select the queue group from the at least one available queue groups the processing circuitry is to select an available queue group with a highest priority from the at least one available queue groups.

7. The device of claim 6, wherein the processing circuitry is further to, for each respective queue group, determine the respective priority of the respective queue group based on at least one of:

a type of commands stored by the respective queue group; and a frequency at which command are received by the respective queue group.

8. The device of claim 1, wherein the processing circuitry is further to:
communicate a fetch response when a command of the at least one command has been fetched from the selected queue group; and
in response to the communication of the fetch response:
update the number of outstanding commands to be fetched from the selected queue group by decrementing the number of outstanding commands based on the fetched command.

9. The device of claim 1, wherein the processing circuitry is further to:
in response to the selection of the queue group from the at least one available queue groups:
communicate a request to fetch a command of the at least one command from the selected queue group; and
update the number of outstanding commands to be fetched from the selected queue group by incrementing the number of outstanding commands based on the request to fetch the command.

10. The device of claim 1, wherein the device is communicatively coupled to a host, and each queue group comprises at least one queue set, each queue set comprises a submission queue and a completion queue, and wherein:
each submission queue is to:
receive a command from the host; and
store the received command; and
each completion queue is to store at least one command fetch response.

11. A method for managing command fetches for a device that comprises at least two queue groups, each queue group comprising respective commands, the method comprising:
for each respective queue group of the at least two queue groups:
determining, by processing circuitry of the device, an allocated command value indicative of a number of commands that are capable of being fetched from the respective queue group;
determining, by the processing circuitry, a number of outstanding commands to be fetched from the respective queue group;
comparing, by the processing circuitry, the allocated command value to the number of outstanding commands to be fetched for the respective queue group; and
in response to determining, by the processing circuitry, that the allocated command value is greater than the number of outstanding commands to be fetched for the respective queue group based on the comparing:
designating, by the processing circuitry, the respective queue group as an available queue group of at least one available queue groups;

selecting, by the processing circuitry, a queue group from the at least one available queue groups; and fetching, by the processing circuitry, at least one command from the selected queue group.

12. The method of claim 11, wherein the device further comprises persistent storage media and at least one command execution queue, each command execution queue corresponding to a queue group and each command execution queue configured to store at least one fetched command, and wherein the method further comprises:
for each respective command execution queue of the at least one command execution queue:
determining whether a respective number of commands in the respective command execution queue exceeds a threshold; and
in response to determining that the respective number of commands stored in the respective command execution queue exceeds the threshold:
designating the respective command execution queue as one of at least one available command execution queues;
selecting a command execution queue from the at least one available command execution queue;
accessing at least one command from the selected command execution queue; and
causing the at least one accessed command to be executed.

13. The method of claim 12, wherein each command execution queue of the at least one command execution queue has a respective threshold, and wherein the method further comprises setting each threshold of a respective command execution queue based on persistent storage media resource allocation for each queue group associated to the respective command execution queue.

14. The method of claim 11, wherein:
each allocated command value for each respective queue group of the at least two queue groups is configurable; and
each allocated command value for each respective queue group of the at least two queue groups is a share of a total command allocation capacity of the device.

15. The method of claim 14, the method further comprising to set a shared allocated command value that is a share of the total command allocation capacity of the device, and wherein the shared allocate command value may be used by any one or more queue group for which a respective number of outstanding commands is greater than a respective allocated command value.

16. The method of claim 11, wherein each queue group of the at least two queue groups has a respective priority; and
wherein selecting the queue group from the at least one available queue groups comprises selecting an available queue group with a highest priority from the at least one available queue groups.

17. The method of claim 16, the method further comprising, for each respective queue group, determining the respective priority of the respective queue group based on at least one of:
a type of commands stored by the respective queue group; and
a frequency at which command are received by the respective queue group.

18. The method of claim 11, the method further comprising:
communicating a fetch response when a command of the at least one command has been fetched from the selected queue group; and
in response to the communicating of the fetch response:
updating the number of outstanding commands to be fetched from the selected queue group by decrementing the number of outstanding commands based on the fetched command.

19. The method of claim 11, the method further comprising:
in response to the selecting of the queue group from the at least one available queue groups:
communicating a request to fetch a command of the at least one command from the selected queue group; and
updating the number of outstanding commands to be fetched from the selected queue group by incrementing the number of outstanding commands based on the request to fetch the command.

20. A non-transitory computer-readable medium having at least two queue groups, each queue group comprising respective commands, and non-transitory computer-readable instructions encoded thereon that, when executed by processing circuitry, cause the processing circuitry to:
for each respective queue group of the at least two queue groups:
determine an allocated command value indicative of a number of commands that are capable of being fetched from the respective queue group;
determine a number of outstanding commands to be fetched from the respective queue group;
compare the allocated command value to the number of outstanding commands to be fetched for the respective queue group; and
in response to a determination that the allocated command value is greater than the number of outstanding commands to be fetched for the respective queue group based on the comparing:
designate the respective queue group as an available queue group of at least one available queue groups;
select a queue group from the at least one available queue groups; and
fetch at least one command from the selected queue group.

* * * * *